United States Patent
Upadhyay et al.

(10) Patent No.: US 8,159,987 B1
(45) Date of Patent: Apr. 17, 2012

(54) METHOD AND SYSTEM FOR EMBEDDING A DATA MESSAGE IN A PILOT SIGNAL

(75) Inventors: Piyush Upadhyay, Mission, KS (US);
William Routt, Leawood, KS (US);
Debashis Haldar, Olathe, KS (US);
John Witzgall, Overland Park, KS (US);
Badri Subramanyan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/218,097

(22) Filed: Aug. 25, 2011

Related U.S. Application Data

(62) Division of application No. 12/137,339, filed on Jun. 11, 2008, now Pat. No. 8,054,772.

(51) Int. Cl.
*H04H 20/71* (2008.01)
(52) U.S. Cl. .................................. 370/312; 370/349
(58) Field of Classification Search ................. 370/312, 370/310.2, 314, 321, 326, 329, 310, 349, 370/328, 338
See application file for complete search history.

(56) References Cited

U.S. PATENT DOCUMENTS

| 7,778,216 B2 * | 8/2010 | Cho ............................. 370/328 |
| 2004/0179506 A1 | 9/2004 | Padovani et al. | |

* cited by examiner

*Primary Examiner* — Brenda H Pham

(57) ABSTRACT

Disclosed herein is a method for data communication between a wireless-communication system and one or more wireless-communication devices. The wireless-communication system broadcasts a standard pilot signal over a pilot channel. The method comprises (a) the wireless-communication system transmitting a first broadcast-mode message in a coverage area of the wireless-communication system, wherein the first broadcast-mode message indicates that the wireless-communication system will be operating in an alternative broadcast mode, and (b) the wireless-communication system operating in the alternative broadcast mode. Operating in the alternative broadcast involves (i) generating a modified pilot signal comprising the standard pilot signal and a data message inserted in the standard pilot signal and (ii) broadcasting the modified pilot signal via the pilot channel, which enables a wireless-communication device receiving the modified pilot signal to extract the data message therefrom.

14 Claims, 5 Drawing Sheets

METHOD AND SYSTEM FOR EMBEDDING A DATA MESSAGE IN A PILOT SIGNAL

RELATED APPLICATION

This application is a divisional of U.S. patent application Ser. No. 12/137,339, entitled "METHOD AND SYSTEM FOR EMBEDDING A DATA MESSAGE IN A PILOT SIGNAL," filed on Jun. 11, 2008.

BACKGROUND

To provide wireless service, a wireless carrier typically operates a number of radio access networks, each of which is controlled by a switching entity such as a mobile switching center. The mobile switching center generally includes or connects with one or more base station controllers, which in turn connect with one or more base transceiver stations. Each base transceiver station conventionally includes a cell tower with one or more antennas that radiate to define an air interface in which wireless-communication devices can operate.

To indicate that service is available, a base station sends out a pilot signal that can be picked up by nearby wireless-communication devices. Typically, the pilot signal is a simple, single-frequency signal. To track available base stations, a wireless-communication device maintains an active set of the base stations that are available to the device. Specifically, if the strength of a given pilot signal is above a predetermined threshold, the wireless-communication device may add the base station to the active set.

Wireless-communication devices such as cellular phones, laptops, and personal digital assistants (PDAs) are evolving to provide increasingly complex and data-intensive services to users. As a result, the extent to which users are relying on such wireless-communication devices is increasing rapidly. Users expect their mobile devices to quickly and reliably provide them information in every aspect of their lives.

Overview

In a world where users rely so heavily on their wireless devices, the ability to broadcast a data message to all users in a coverage area or sector as quickly as possible is highly desirable. As just one example, in an emergency situation, a service provider may wish to broadcast an emergency data message to all users at a certain location. Yet despite the fact that wireless-network infrastructure can support a large number of users in a given area, there is a limit to the number of users with whom a radio access network can communicate.

For example, in a code division multiple access (CDMA) network, only a given number of text messages can be delivered simultaneously by a base station. As a result, if too many users are located within a given sector, multiple rounds of messaging may be necessary to send a message to all users in the sector. Thus, an emergency broadcast system that quickly delivers emergency messages is not feasible using existing messaging systems (e.g. SMS, MMS, e-mail, etc.). Take for instance, a college campus with approximately 12,000 subscribers on a given wireless carrier's network. Sending an emergency text message to every subscriber could take as long as 80 minutes, and even in a best case scenario, would likely take 60 minutes or more.

Accordingly, disclosed herein is a method and system which allows for a data message to be broadcast to all users in a sector approximately simultaneously. The present invention takes advantage of the fact that wireless communication devices in a radio access network monitor the pilot channel for a pilot signal, by inserting a data message (such as a text message) into the pilot signal. As a result, every WCD operating in the sector may receive the pilot signal with the data message, and extract the data message therefrom.

Specifically, a method for data communication between a wireless-communication system and one or more wireless-communication devices is disclosed. The wireless-communication system broadcasts a standard pilot signal over a pilot channel. The method comprises (a) the wireless-communication system transmitting a first broadcast-mode message in a coverage area of the wireless-communication system, wherein the first broadcast-mode message indicates that the wireless-communication system will be operating in an alternative broadcast mode, and (b) the wireless-communication system operating in the alternative broadcast mode. Operating in the alternative broadcast involves (i) generating a modified pilot signal comprising the standard pilot signal and a data message inserted in the standard pilot signal and (ii) broadcasting the modified pilot signal via the pilot channel, which enables a wireless-communication device receiving the modified pilot signal to extract the data message therefrom. The method may further comprise, after broadcasting the modified pilot signal, the wireless-communication system transmitting a second broadcast-mode message in the coverage area, wherein the second broadcast-mode message indicates that the wireless-communication system will no longer be operating in the alternative broadcast mode.

In another aspect, a system configured to provide service to a wireless-communication device is disclosed. The system comprises at least one processor and program code stored in data storage and executable by the at least one processor. The program code executable to (a) transmit a first broadcast-mode message in a coverage area of the wireless-communication system, wherein the first broadcast-mode message indicates that the wireless-communication system will be operating in an alternative broadcast mode and (b) operate in the alternative broadcast mode. The program code executable to operate in the alternative broadcast mode comprises program code executable by the processor to (i) generate a modified pilot signal comprising the standard pilot signal and a data message inserted in the standard pilot signal and (ii) broadcast the modified pilot signal via the pilot channel, which enables a wireless-communication device that receives the modified pilot signal to extract the data message therefrom.

In another aspect, a method for receiving a data message from a wireless-communication system is disclosed. The wireless-communication system broadcasts a standard pilot signal over a pilot channel. The method comprises (a) monitoring the pilot channel for the standard pilot signal, (b) receiving a first broadcast-mode message that is broadcast by the wireless-communication system, wherein the first broadcast-mode message indicates that the wireless-communication system will be operating in an alternative broadcast mode, and (c) after receiving the first broadcast-mode message (i) monitoring the pilot channel for a modified pilot signal, wherein the modified pilot signal comprises the standard pilot signal and a data message inserted in the standard pilot signal, (ii) receiving the modified pilot signal over the pilot channel, and (iii) after beginning receipt of the modified pilot signal, extracting the data message from the modified pilot signal.

In another aspect, a wireless-communication device configured to receive a data message from a wireless-communication system is disclosed. The wireless-communication system is configured to broadcast a standard pilot signal over the pilot channel. The wireless-communication device comprises a processor and program code stored in data storage and executable by the processor to (a) monitor the pilot channel for the standard pilot signal, (b) receive a first broadcast-mode message that is broadcast by the wireless-communication system, wherein the first broadcast-mode message indicates that the wireless-communication system will be operating in an alternative broadcast mode, and (c) after the first broadcast-mode message is received (i) monitor the pilot channel for a modified pilot signal, wherein the modified pilot signal comprises the standard pilot signal and a data message inserted in the standard pilot signal, (ii) receive the modified pilot signal over the pilot channel, and (iii) after beginning receipt of the modified pilot signal, extract the data message from the modified pilot signal.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Disclosed herein is a method and system for advantageously using the pilot channel in a wireless-communication system for data communication. Since wireless-communication devices (WCDs) regularly monitor the pilot channel, broadcasting data via the pilot channel can be particularly useful in scenarios where information needs to be communicated to a large number of users as quickly as possible. For example, an emergency message can be broadcast over the pilot channel and received approximately simultaneously by all WCDs monitoring the pilot channel. It should be understood, however, that the disclosed invention may be useful in many other scenarios as well.

Figure 1:
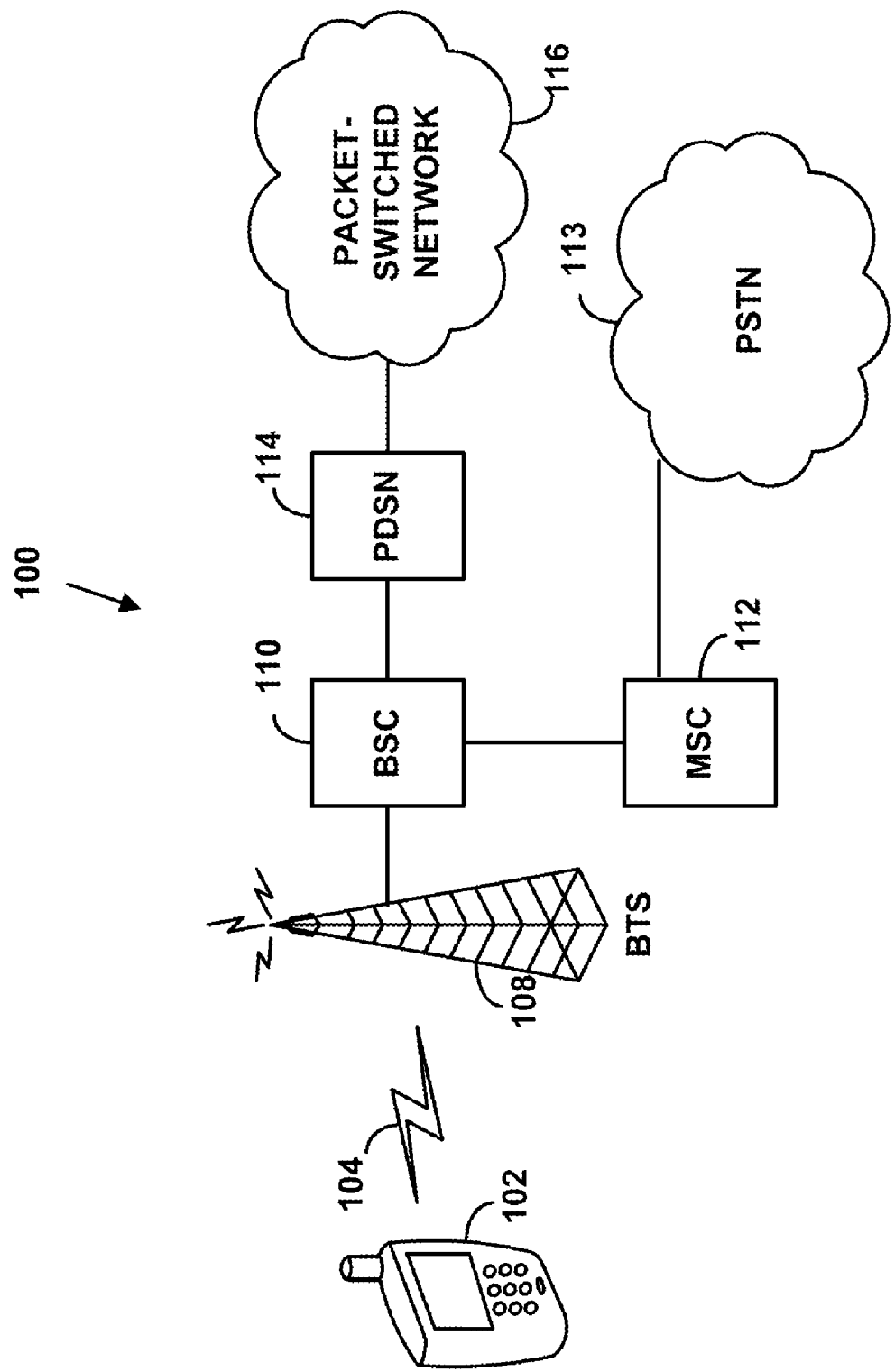
FIG. 1 is a simplified block diagram of a communication system in accordance with an exemplary embodiment.

FIG. 1 depicts an example radio access network (RAN) 100 that is operable to provide service to a WCD 102. The WCD 102 may take the form of a cellular telephone, wireless PDA, or wireless personal computer, as examples. Further, while only one WCD is shown in FIG. 1, RAN 100 may serve multiple WCDs. WCD 102 may communicate over an air interface 104 with a base transceiver station (BTS) 108, which may also be referred to as a "base station." BTS 108 may be coupled to or integrated with a base station controller (BSC) 110, which functions to route communications to and from BTS 108. In particular, BSC 110 may route communications between BTS 108 and a mobile switching center (MSC) 112, which in turn may connect to a public switched telephone network (PSTN) 113. Additionally or alternatively, BSC 110 may route communications to a packet-data serving node (PDSN) 114, which may act as a gateway for packet-data communications over a packet-switched network 116.

Communications between WCD 102 and BTS 108 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), Bluetooth, and/or infrared, among others. Air interface communications from the BTS to the WCD may be referred to as "forward link" or "downlink" communications, while those from the WCD to the BTS may be referred to as "reverse link" or "uplink" communications.

To provide the arrangement of FIG. 1 in practice, each WCD is commonly equipped with a "mobile station modem" chipset such as one of the various "MSM" chipsets available from Qualcomm Incorporated, and each BTS is commonly equipped with a "cell site modem" chipset such as one of the various "CSM" chipsets available from Qualcomm Incorporated. Preferably, the air-interface protocols under which service is provided by BTS 108 include EV-DO. By way of example, each cell site modem can be a Qualcomm CSM6800™ chipset, and each mobile station modem can be an MSM6800™ chipset. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including upgrades to the chipsets named herein, as well as others providing similar functionality, may also be utilized without departing from the scope of the invention.

Under EV-DO, the forward link uses time-division multiplexing (TDM) in order to allocate all of the sector's forward-link power to a given WCD at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, a Medium Access Control (MAC) channel, and, if any traffic exists, a forward traffic channel and a "control" channel. Each EV-DO sector is further defined by a PN offset.

In one aspect, RAN 100 may be configured to broadcast a pilot signal over air interface 104 to WCD 102. In particular, a pilot signal may be broadcast by BTS 108 and WCD 102 may detect or receive the pilot signal. Typically, the pilot signal is a simple, single-frequency signal that is transmitted from the BTS to a WCD to convey that communication services are available. As such, a pilot signal carrying an indication of the sector's PN offset may be broadcast over the pilot channel by BTS 108.

A WCD operating under EV-DO monitors the pilot signals emitted by various sectors as a basis to facilitate handoff from one sector to another. As such, pilot signals are not directed to specific WCDs. Instead, a BTS simply broadcasts a pilot signal within its sector so that a WCD operating in the sector can detect and receive the pilot signal. Thus, the pilot signal indicates the availability of wireless service to all WCDs in a sector approximately simultaneously, in a single broadcast. The present invention takes advantage of this configuration for the heretofore unexplored purpose of data messaging. In an exemplary embodiment, a data message is embedded in the standard pilot signal, creating a modified pilot signal. The data message can then be efficiently conveyed to all WCDs in a sector by broadcasting the modified pilot signal via the pilot channel.

Figure 2:
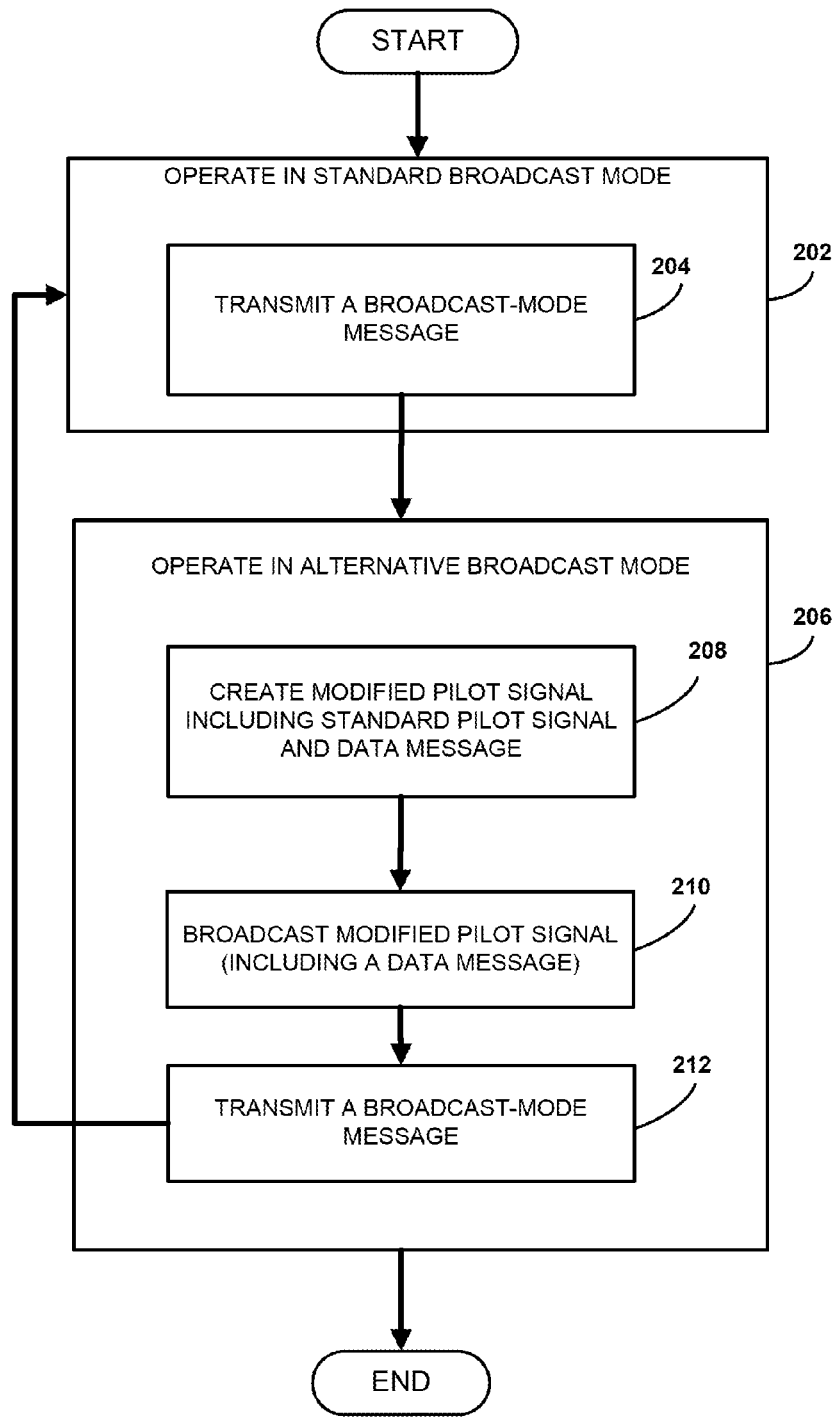
FIG. 2 is a flow chart illustrating a method for data communication via the pilot channel in accordance with an exemplary embodiment.

FIG. 2 is a flow chart illustrating a method for data communication via the pilot channel. Preferably, the method is carried out by an entity or entities of a wireless-communication system, such as a BTS. However, other network and non-network entities, alone or in combination, may be employed to carry out the method. Therefore, it should be understood that steps or processes that are herein attributed to a wireless-communication system or a BTS may be carried out by various other entities or combinations of entities without departing from the scope of the invention.

Initially, the wireless-communication system is operating in a standard broadcast mode, as shown in block 202. Operating in the standard broadcast mode may involve a BTS broadcasting a pilot signal (also referred to herein as a "standard" pilot signal) over the pilot channel. While in the standard broadcast mode, the BTS may transmit a first broadcast-mode message to notify WCDs that the BTS will soon begin operating in an alternative broadcast mode, as shown by block 204. Once the BTS alerts WCDs in its coverage area, the system proceeds to operate in the alternative broadcast mode, as shown by block 206. Operating in the alternative broadcast mode may involve generating a modified pilot signal, which includes a data message and the standard pilot signal, as shown by block 208, and then broadcasting the modified pilot signal over the pilot channel, as shown by block 210. Further, the BTS may transmit a second broadcast-mode message that notifies WCDs in its coverage area that the BTS will be returning to the standard broadcast mode, as shown by block 212. After the BTS transmits the second broadcast-mode message, the system proceeds to operate in the standard broadcast mode, as shown by block 202.

Typically, transmitting a broadcast-mode message may involve a BTS broadcasting the broadcast-mode message over the pilot channel. For example, the BTS may consecutively broadcast a predetermined number of consecutive "0" or "1" bits over the pilot channel. Thus, any WCD monitoring the pilot channel can detect when the pilot signal includes the predetermined number of consecutive "0" or "1" bits and prepare to receive a data message over the pilot channel. Alternatively, transmitting a broadcast-mode message may involve sending an SMS or MMS message or messages, sending a message or messages via the paging channel, or sending messages in any way so as to alert devices operating in the coverage area of the BTS that the system will be operating in a different broadcast mode than the current broadcast mode (e.g. switching from the standard to alternative broadcast mode or vice versa).

Alternatively or additionally, the broadcast-mode message may comprise a number of messages that collectively convey that the system will be switching from one broadcast mode to another. Further, while FIG. 2 depicts only two broadcast modes it is contemplated that the method may also involve more than two broadcast modes (i.e. with other broadcast modes in addition to the standard and alternative broadcast modes). Accordingly, the method may involve broadcast-mode messages corresponding to each broadcast mode.

In the alternative broadcast mode, the system may create a modified pilot signal by inserting a data message in the pilot signal. In an exemplary embodiment, the data message may be inserted by interleaving the data message with the pilot signal. Various techniques now known or yet to be discovered may be used for interleaving. Ultimately, any interleaving technique may be used so long as a WCD receiving the modified pilot signal can deinterleave the signal to extract the data message. In an exemplary embodiment, an interleave factor of "i" may be used. With an interleave factor of "i," one bit from the data message is inserted after every (i−1) bits of the original pilot signal.

Figure 3:
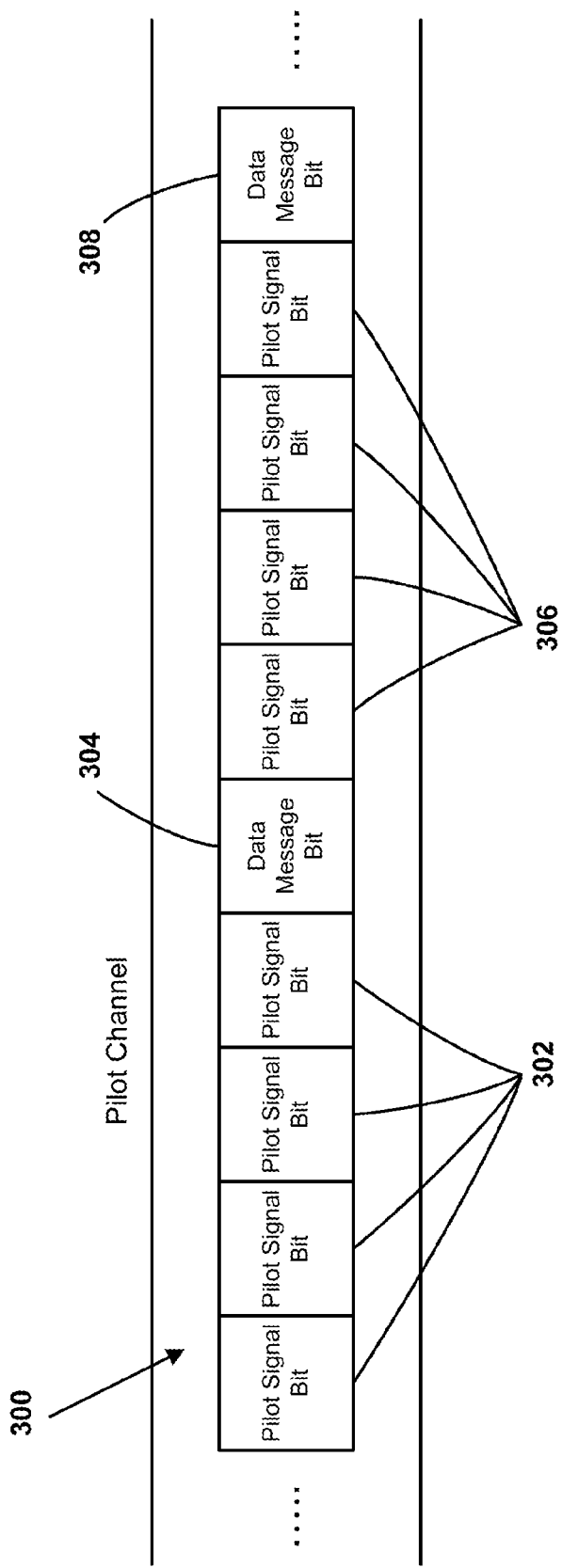
FIG. 3 is a simplified block diagram depicting a section of a modified pilot signal in accordance with an exemplary embodiment.

FIG. 3 is a simplified block diagram depicting a section of a modified pilot signal 300 according to an exemplary embodiment. In this example, a data message is interleaved with the standard pilot signal using an interleave factor of "i" equal to 5. As a result, four bits 302 from the standard pilot signal are followed by single bit 304 from the data message. Data-message bit 304 is then followed by the four more bits 306 from the standard pilot signal, which in turn are followed by another bit 308 from the data message. This pattern of four pilot-signal bits followed by a single data-message bit may continue until the data message has been made available in its entirety.

Using modified pilot signal 300, the time to complete the broadcast of a data message to all users in a coverage area is substantially independent of the number of users in the coverage area. Generally, the broadcast time is dependent on the interleave factor i and the number of bits in the data message, although other factors, such as network conditions, may factor into the broadcast time. For example, in EV-DO, where 2 bits are assigned for the pilot channel, and a data frame is transmitted in 1.67 ms, the broadcast time "T" to complete the broadcast of a N-bit broadcast-mode message, followed by an M-bit data message, is generally given by the formula:

$$T=(1.67*N/2)ms+i*1.67*M/2)ms$$

As a more specific example, the time for delivery of a 1000-bit data message using an interleave factor of i equal to 5, and a 4-bit broadcast-mode message, is approximately $T=((1.67*4)/2)$ ms$+(5*1.67*1000/2)$ ms$=4178.34$ ms.

Returning to FIG. 2, the depicted method may be initiated in various ways and by various entities. For instance, the wireless-communication system may be instructed that it should switch to operating in the alternative broadcast mode or the system may itself determine that it will be operating in the alternative broadcast mode. In an exemplary embodiment, an Emergency Messaging System (EMS) may instruct the wireless-communication system to switch to the alternative broadcast mode in order to send one or more emergency data messages. Law enforcement or other governmental authorities may work with the service provider to set up an EMS and configure the EMS to communicate with the wireless-communication system. Provided with the EMS, the authorities may send an emergency data message to the system for the system to broadcast. Alternatively, a message may be sent to the system that allows the law enforcement or governmental authorities some level of control over the system. An emergency message may then be broadcast from the authorities via the system. The alternative broadcast mode may also be initiated manually by the authorities or by a service provider on behalf of the authorities. Alternatively, the system may itself determine that it will operate in an alternative broadcast mode.

It should be understood that the alternative broadcast mode may also be used in many non-emergency situations. For example, in a coverage area including a sporting venue, scores or statistics may be periodically broadcast via the pilot channel so that spectators in the venue will receive updates. In this situation, the system may determine that it will enter an alternative broadcast mode whenever certain events, such as a scoring event, occur. Other uses, such as weather reporting and flight-status updates are also possible.

An exemplary method may be used in conjunction with or as a part of the system detailed by the Commercial Mobile Alert System (CMAS) standard, which was recently adopted by the Federal Communications Commission (FCC). The CMAS standard provides for an alert system that, when an emergency or natural disaster occurs, notifies the public via text messages. As discussed, text messaging may be an extremely time-consuming means for communicating an emergency message. As such, an exemplary method may be used to broadcast emergency messages via the pilot channel, rather than using text messages. Further, this method may be implemented with the infrastructure currently set forth by CMAS, or via modifications to CMAS.

Figure 4:
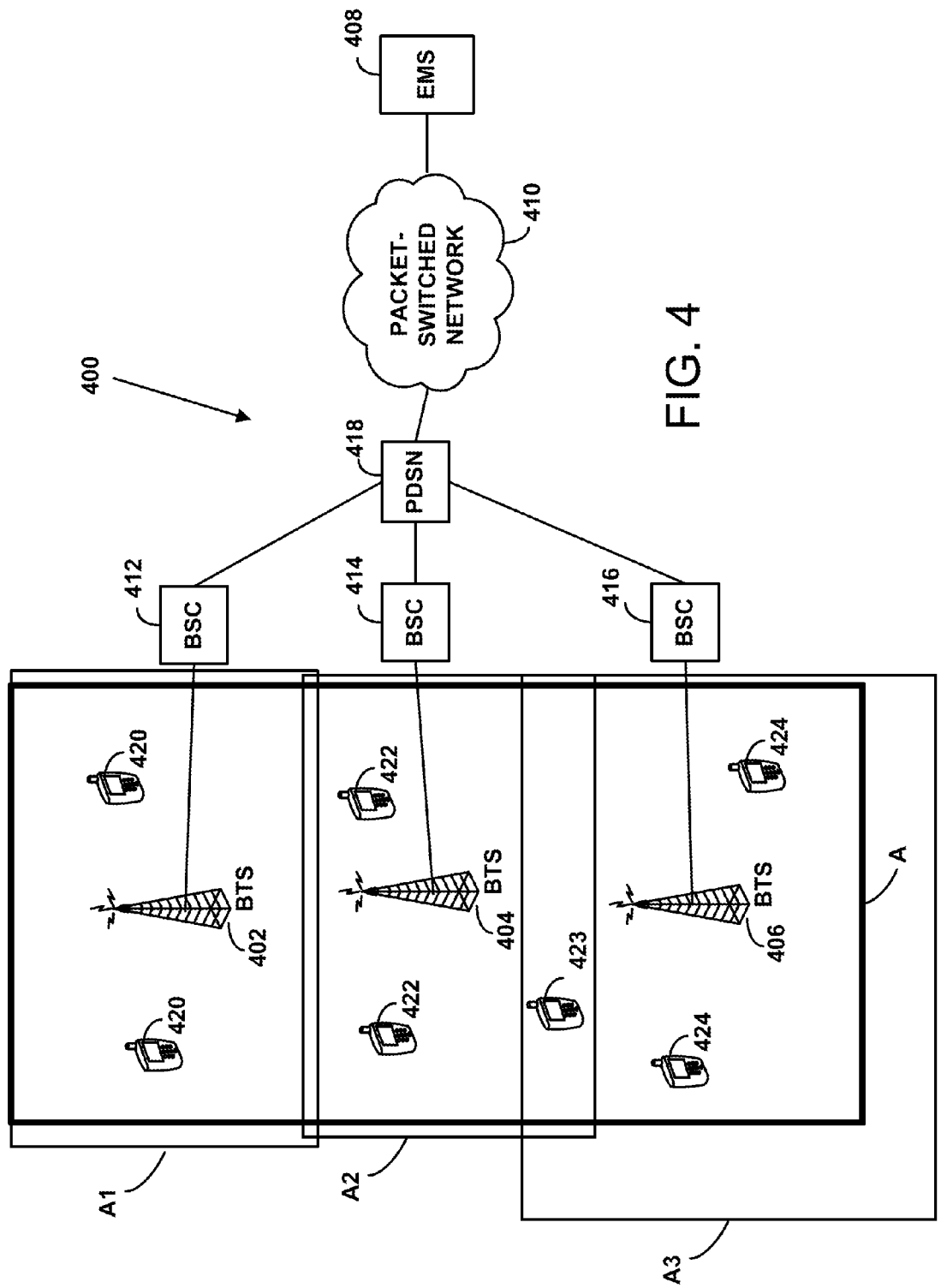
FIG. 4 is a block diagram depicting a system configured to communicate data via the pilot channel in accordance with an exemplary embodiment.

FIG. 4 is a block diagram depicting a wireless-communication system 400 configured to communicate data via the pilot channel. Wireless-communication system 400 includes a radio access network (RAN) that comprises BTSs 402-406, BSCs 412-416, and PDSN 418. BTSs 402-406 provide service in sectors A1, A2, and A3, respectively. Sectors A1, A2 and A3 may also be referred to collectively as coverage area A. Also shown is an Emergency Messaging System 408, which sits as a node on packet-switched network 410. BTSs 402-406 send data to, and receive data from, EMS 408 via BSCs 412-416 (respectively), PDSN 418, and packet-switched network 410.

Each BTS 402-406 provides service in its respective sector A1-A3. In the depicted scenario, WCDs 420 are located in coverage area A1 and thus may be provided service by BTS 402. Likewise, WCDs 422 and WCDs 424 are located in sectors A2 and A3, respectively, and thus may be provided service by BTSs 404 and 406, respectively. WCD 423 is located in an area where service is available from both BTS 404 and BTS 406. As such, WCD 423 may receive pilot signals from both BTS 404 and BTS 406 and select the BTS with the greatest pilot-signal strength to provide service.

To initiate a data-message broadcast via the pilot channel, each BTS 402-406 may be configured to receive an instruction or initiation message indicating that the BTS should operate in the alternative broadcast mode or that the EMS has a data message that needs to be broadcast. The instruction or initiation message may originate from EMS 408 or another entity. In particular, EMS 408 may be equipped with or have access to well-known software, hardware, and/or firmware for packet-data connectivity with packet-switched network 410. Provided with packet-data connectivity, EMS 408 can send an instruction or initiation message to one or more RANs (generally to a specific entity of the RAN, such as a BTS). Further, following the instruction or initiation message, EMS 408 may be configured to send the RAN an emergency data message for broadcast in a coverage area. Alternatively, EMS 408 may simply send a data message to the RAN, without first sending an instruction or initiation message.

Each BTS 402-406 is configured to send a broadcast-mode message over its pilot channel so as to alert WCDs in its coverage area that the BTS will be operating in the alternative broadcast mode. Specifically, a broadcast-mode message from BTS 402 can be received by WCDs 420, which are operating in sector A1. Likewise, broadcast-mode messages from BTS 404 and BTS 406 can be received by WCDs 422 and WCDs 424, respectively. Since WCD 423 is positioned in a location where service is available from both BTS 404 and BTS 406, WCD 423 may receive a broadcast-mode message from both BTSs.

When PDSN 418 receives a data message from EMS 408, PDSN 418 will forward the data message on to the BTSs (via the respective BSCs) serving the sectors for which the message is intended. To facilitate this process, EMS 408 may indicate to PDSN 418 the coverage area, such as sector A, to which a data message should be broadcast. Alternatively or additionally, EMS 408 may indicate specific BTSs to which the data message should be relayed by PDSN 418. Since sectors A1-A3 collectively provide service to coverage area A, a data message intended for coverage area A will be forwarded by PDSN 418 to BTSs 402-406, which then broadcast the data message in their respective sectors A1-A3.

To broadcast a data message, each BTS 402-406 is configured to operate in an alternative broadcast mode. In the alternative broadcast mode, a BTS may create a modified pilot signal by inserting a data message into a standard pilot signal. Specifically, the BTS can interleave the data message with the standard pilot signal that the BTS typically broadcasts. The interleaving of the data message and standard pilot signal may be accomplished using processes described herein or otherwise. The BTS can then broadcast the modified pilot signal over its pilot channel.

When PDSN 418 relays a data message to BTSs 402-406, each BTS should receive and transmit the broadcast-mode message at approximately the same time. As such, a WCD within the range of multiple BTSs that are transmitting the broadcast-mode message, such as WCD 423, may receive the broadcast-mode message (and possibly the data message) from more than one BTS at approximately the same time. It should be understood, however, that factors such as network conditions or the distance between WCD 423 and each BTS may cause the broadcast-mode messages to reach WCD 423 at slightly different times. As such, the device may be equipped to detect that it is receiving multiple versions of a message, so that the device can understand the data message.

Further, while a BTS is operating in the alternative broadcast mode, the BTS may periodically re-broadcast the broadcast-mode message. By doing so, a WCD that enters the coverage area after the initial broadcast of the broadcast-mode message, may be alerted that the BTS is operating in the alternative broadcast mode message.

Figure 5:
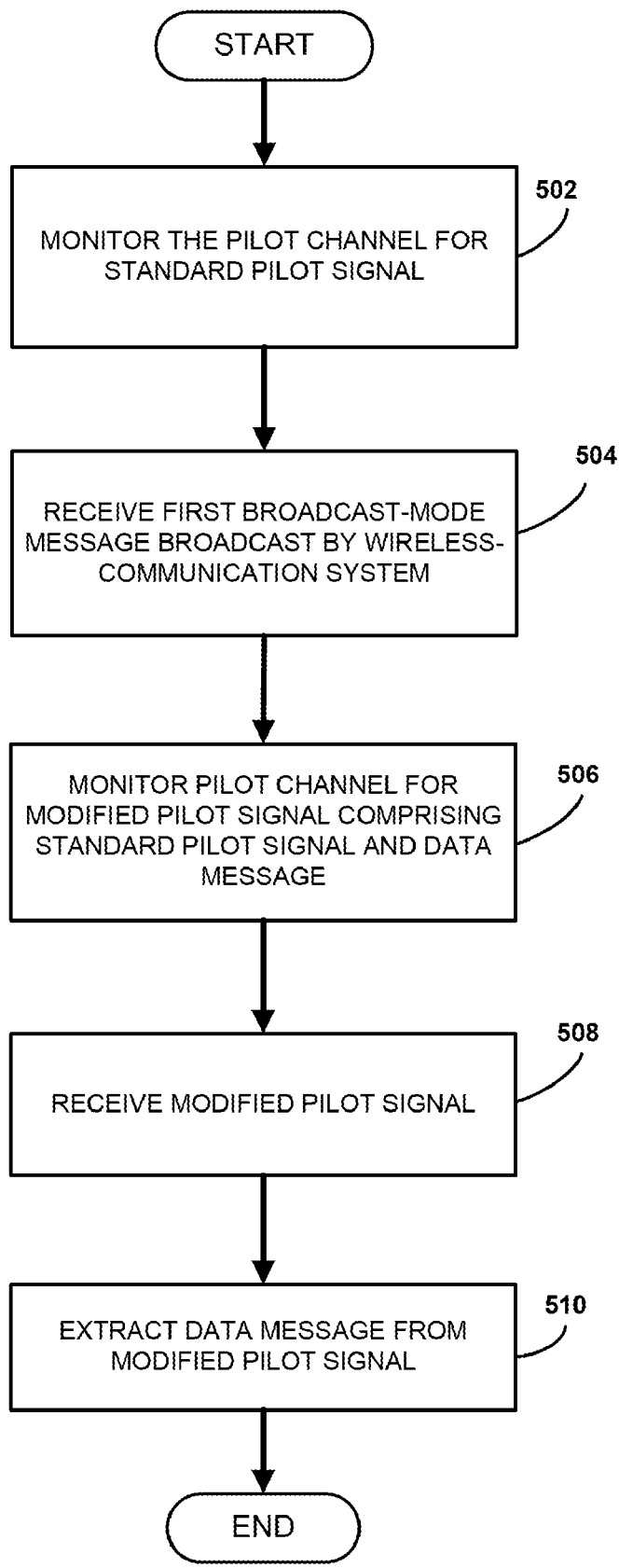
FIG. 5 is a flow chart illustrating a method for receiving a data message over the pilot channel in accordance with an exemplary embodiment.

FIG. 5 is a flow chart illustrating a method for receiving a data message over the pilot channel in accordance with an exemplary embodiment. In an exemplary embodiment, the data message is sent by a wireless-communication system configured to broadcast a standard pilot signal and a modified pilot signal over the pilot channel. In the exemplary embodiment, the method is carried out by a WCD, although other entities or combinations of entities may also perform the method.

The method involves a WCD initially monitoring the pilot channel for the standard pilot signal, as shown by block 502. When the WCD is monitoring the pilot channel for the standard pilot signal, it may be said that the WCD is operating in a standard reception mode. Then the WCD receives a first broadcast-mode message that is broadcast by the wireless-communication system, as shown by block 504. This broadcast-mode message indicates to the WCD that the wireless-communication system will be operating in an alternative broadcast mode.

In the exemplary embodiment, the received broadcast-mode message takes the format of a message specifically broadcast by a BTS, to indicate that the BTS will be switching to the alternative broadcast mode. This message may be received before the broadcast begins or, if the WCD enters the coverage area of a BTS after the BTS has switched to the alternative broadcast mode, may be received when the BTS periodically re-broadcasts the broadcast mode message. In the alternative, if the WCD enters the coverage area of a BTS after the BTS has switched to the alternative broadcast mode, the modified pilot signal may serve as the broadcast mode message. Specifically, the WCD may detect that it is not receiving a standard pilot signal as expected. In response, the WCD may look for a modified pilot signal, and attempt to extract a data message from the pilot signal.

After receiving the first broadcast-mode message, the WCD may be said to operate in a second or alternative reception mode. Specifically, the WCD monitors the pilot channel for a modified pilot signal that is broadcast by the wireless-communication system, as shown in block 506. The modified pilot signal comprises the standard pilot signal and a data message inserted in the standard pilot signal. The WCD then receives the modified pilot signal, as shown by block 508. After beginning receipt of the modified pilot signal, the WCD extracts the data message from the modified pilot signal, as shown by block 510.

The WCD may begin extracting and/or reconstructing the data message as soon as the WCD begins receiving the modified pilot signal. This function may be referred to as receiving the data message in "real-time". When a data message is received in real-time, the WCD reconstructs the message as the message is received, rather than waiting to receive the entire data message before processing it. For example, if the data message is interleaved with the pilot signal using an interleave factor of "i", the WCD may extract every $i^{th}$ bit, and use it to reconstruct the data message. For instance, if the data message includes text, each word or each letter may be displayed as it is received. Alternatively, the WCD may wait until the modified pilot signal including the entire data message is received before extracting, reconstructing, and/or displaying the data message.

At a later time, typically after extracting the data message, the WCD may receive a second broadcast-mode message that is broadcast by a wireless-communication system. The second broadcast-mode message may indicate to the WCD that the wireless-communication system is going to switch back to the standard broadcast mode or switch to another broadcast mode. In response, the WCD may cease monitoring the pilot channel for a modified pilot signal and begin monitoring the pilot channel for a standard pilot signal.

It should also be understood that broadcast-mode messages may be state-independent or state-dependent. For example, in a system implementing state-independent broadcast-mode messages, the first broadcast-mode message specifically identifies the alternative broadcast mode as the broadcast mode the BTS will be switching to. Likewise, the second broadcast-mode message specifically identifies the standard broadcast mode. Furthermore, in a system with more than two broadcast modes, a different state-independent broadcast-mode message may be used to switch to each broadcast mode.

Alternatively, in a system implementing state-dependent broadcast-mode messages, the first and second broadcast-mode message may consist of the same message, sent at different times (e.g. while the system is in different states). With this configuration, broadcast-mode messages are not necessarily tied to a specific broadcast mode. Rather, the WCDs receiving a broadcast-mode message may be configured to know the current broadcast mode of the system (i.e. the "state" of the system). As such, when the system is operating in the standard broadcast mode, a WCD may determine that receipt of a broadcast-mode message indicates that a switch to the alternative broadcast mode is going to occur. Likewise, when the system is operating in the alternative broadcast mode, WCDs may determine that receipt of a broadcast-mode message indicates that the system is going to switch to the standard broadcast mode.

In a system with state-dependent broadcast-mode messages and more than two broadcast modes, state transitions may be defined to indicate a next broadcast mode (i.e. the broadcast mode in which the system will be operating) for each {broadcast-mode message, current broadcast mode} pair. Specifically, when the system will be switching to a next broadcast mode, the system may reference the state-transition information, and select a broadcast-mode message that, for the current broadcast mode, indicates the system will be operating in the next broadcast mode. Provided with this state-transition information, a WCD that receives a broadcast-mode message can determine the destination broadcast mode for a particular broadcast-mode message.

As discussed, a WCD within the range of multiple BTSs may receive the broadcast-mode message and/or the data message from more than one BTS at approximately the same time. Thus, WCDs may be equipped to handle reception of duplicative copies of a broadcast-mode message and/or duplicative copies of a data message. Specifically, the WCD may be configured to only extract the data message from the pilot signal sent by its serving BTS (e.g., the BTS having the greatest pilot-signal strength). However, a WCD receiving more than one modified pilot signal may extract the standard pilot signal from non-serving BTSs, as well as its serving BTS. By doing so, a WCD can continue to update its active set while it receives a data message. Alternatively, a WCD may be configured to process multiple copies of the data message extracted from multiple modified pilot signals. In such embodiments, a WCD may take advantage of the multiple copies to perform error correction or improve the quality of the received data message by cross-referencing or combining the different copies of the data message.

Further, a WCD may extract a data or emergency message from the pilot signal of any BTS in its active set (regardless of whether a connection is currently established with a BTS). For instance, if a WCD is located at the "edge" of a coverage area in which an emergency broadcast is occurring, some BTSs in its active set may be operating in a standard broadcast mode, while others may be operating in an alternative broadcast mode (e.g., sending an emergency message). Accordingly, the WCD may extract the emergency message from the pilot signal of a BTS operating in the alternative broadcast mode. The WCD may do so even if it connected to a BTS operating in the standard broadcast mode. On the other hand, in an alternative embodiment, the WCD may only extract a data message if the data message is received via the pilot channel of its serving BTS.

Example embodiments of the present invention have been described above. Those skilled in the art will understand, however, that changes and modifications may be made to these embodiments without departing from the true scope and spirit of the invention, which is defined by the claims.

We claim:

1. A method for receiving a data message from a wireless-communication system, wherein the wireless-communication system initially broadcasts a standard pilot signal over a pilot channel, the method comprising:

initially monitoring the pilot channel for the standard pilot signal;

receiving a first broadcast-mode message that is broadcast by the wireless-communication system, wherein the first broadcast-mode message indicates that the wireless-communication system will be operating in an alternative broadcast mode;

in response to receiving the first broadcast-mode message:

monitoring the pilot channel for a modified pilot signal, wherein the modified pilot signal comprises the standard pilot signal and a data message inserted in the standard pilot signal;

receiving the modified pilot signal over the pilot channel; and after beginning receipt of the modified pilot signal, extracting the data message from the modified pilot signal.

2. The method of claim 1 further comprising, after receiving the modified pilot signal, extracting the standard pilot signal from the modified pilot signal.

3. The method of claim 1, further comprising receiving a second broadcast-mode message, wherein the second broadcast-mode message indicates that the wireless-communication system will no longer be operating in the alternative broadcast mode.

4. The method of claim 3, further comprising, in response to the second broadcast-mode message, monitoring the pilot channel for the standard pilot signal.

5. The method of claim 1, wherein receiving the first broadcast-mode message comprises receiving a predetermined number of consecutive bits having the same value.

6. The method of claim 1, wherein the data message is an emergency data message.

7. The method of claim 1, wherein the modified pilot signal comprises the standard pilot signal interleaved with the data message, and wherein extracting the data message from the modified pilot signal comprises de-interleaving the modified pilot signal.

8. A wireless-communication-device system configured to receive a data message from a wireless-communication system, wherein the wireless-communication-device system is configured to broadcast a standard pilot signal over the pilot channel, the system comprising:
 a processor; and
 program code stored in data storage and executable by the processor to:
  monitor the pilot channel for the standard pilot signal;
  receive a first broadcast-mode message that is broadcast by the wireless-communication system, wherein the first broadcast-mode message indicates that the wireless-communication system will be operating in an alternative broadcast mode;
  after the first broadcast-mode message is received:
   monitor the pilot channel for a modified pilot signal, wherein the modified pilot signal comprises the standard pilot signal and a data message inserted in the standard pilot signal;
   receive the modified pilot signal over the pilot channel; and
   after beginning receipt of the modified pilot signal, extract the data message from the modified pilot signal.

9. The system of claim 8 further comprising program code stored in data storage and executable by the processor to, after receipt of the modified pilot signal, extract the standard pilot signal from the modified pilot signal.

10. The system of claim 8, further comprising program code stored in data storage and executable by the processor to receive a second broadcast-mode message, wherein the second broadcast-mode message indicates that the wireless-communication system will no longer be operating in the alternative broadcast mode.

11. The system of claim 10, further comprising program code stored in data storage and executable by the processor to, in response to the second broadcast-mode message, monitor the pilot channel for the standard pilot signal.

12. The system of claim 8, wherein the first broadcast-mode message comprises a predetermined number of consecutive bits of the same value.

13. The system of claim 8, wherein the data message is an emergency data message.

14. The system of claim 8, wherein the modified pilot signal comprises the standard pilot signal interleaved with the data message, and wherein the program code stored in data storage and executable by the processor to extract the data message from the modified pilot signal comprises program code stored in data storage and executable by the processor to de-interleave the modified pilot signal.

* * * * *